United States Patent [19]
Hawley

[11] 3,819,866
[45] June 25, 1974

[54] LIGHT COUPLED LOOP CURRENT DETECTOR

[75] Inventor: George Thomas Hawley, Murray Hill, N.J.

[73] Assignee: Bell Telephone Laboratories, Incorporated, Murray Hill, N.J.

[22] Filed: Dec. 18, 1972

[21] Appl. No.: 316,076

[52] U.S. Cl. ........................ 179/16 AA, 179/18 FA
[51] Int. Cl. ............................................. H04m 3/22
[58] Field of Search ........... 179/16 R, 16 A, 16 AA, 179/16 E, 16 EA, 16 F, 18 F, 18 FA, 81 R, 179/84 R

[56] References Cited

UNITED STATES PATENTS

| | | | |
|---|---|---|---|
| 3,410,961 | 11/1968 | Slana | 179/18 FA |
| 3,504,127 | 3/1970 | Slana | 179/16 F |
| 3,622,709 | 11/1971 | Tjaden | 179/18 F |
| 3,671,676 | 6/1972 | Henry et al. | 179/16 F |
| 3,783,198 | 1/1974 | Couch | 179/16 AA |

FOREIGN PATENTS OR APPLICATIONS

| | | | |
|---|---|---|---|
| 884,832 | 12/1961 | Great Britain | 179/18 F |

*Primary Examiner*—Kathleen H. Claffy
*Assistant Examiner*—Randall P. Myers
*Attorney, Agent, or Firm*—Joseph A. Cameron

[57] ABSTRACT

This loop current detector includes four light-emitting diodes and a bridge circuit electrically isolated therefrom with two photoresponsive arms and two resistive arms. Two light-emitting diodes are connected in parallel in opposite polarities and inserted in series with each conductor. Each photoresponsive arm is optically coupled to the light-emitting diodes that respond to loop current of a respective sense. Longitudinal currents therefore cause both photoresponsive arms to be illuminated, thereby leaving the bridge in balance; loop currents cause only one photoresponsive arm to be illuminated, thereby providing bridge output.

7 Claims, 1 Drawing Figure

PATENTED JUN 25 1974 3,819,866
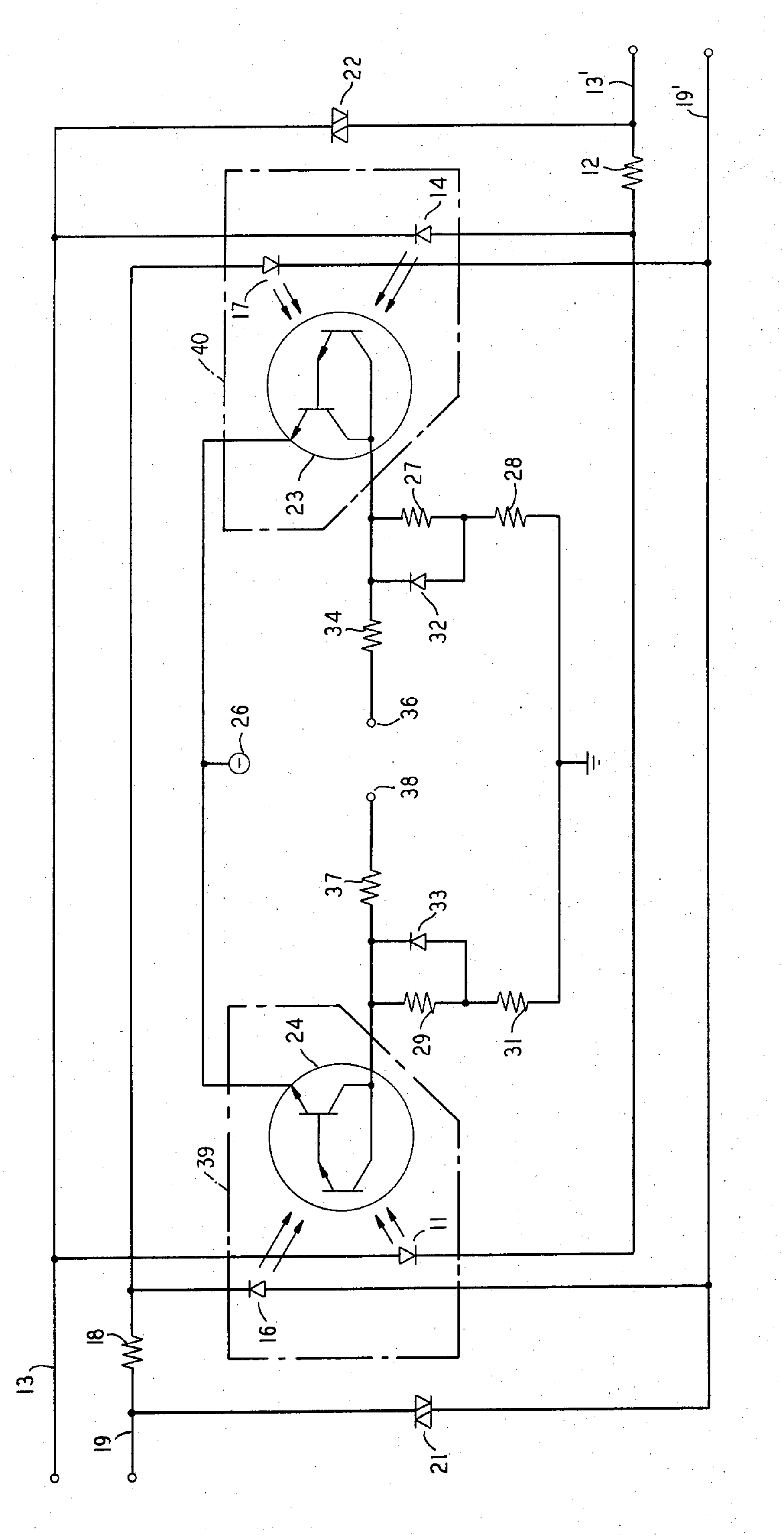

LIGHT COUPLED LOOP CURRENT DETECTOR

BACKGROUND OF THE INVENTION

This invention relates to the field of wire communications, particularly to the detection of dc and low frequency electrical loop currents on a pair of conductors.

Any wire communications system with a capability of selectively interconnecting any of a large number of stations requires some sort of supervisory signaling for requesting service, answering such requests, addressing messages, answering calls, etc. Commercial telephone systems commonly use for this purpose direct current on the conductor pairs driven by a central office power supply. DC supervisory signals are generated at the subscriber's telephone set by the opening and closing of a switch activated by the subscriber lifting and replacing the handset and operating the dial.

When the subscriber loops are short, as in typical urban areas, the loop resistance is low, signaling currents are high, and ordinary relays are satisfactory for detecting the currents at the central office. As the distance increases between the subscriber and the central office, however, the resistance of the subscriber loop increases, and the currents driven by the central office power supply decrease. More important, however, longitudinal currents also flow in the loop conductors because of differences in ground potential, leakage, inductive and capacitive coupling to power lines, and electrical disturbances. These currents rise as the length of the subscriber loop increases, greatly increasing the problem of detecting the loop currents. It is not uncommon for potentials of hundreds of volts to exist between the loop conductors and ground, driving longitudinal currents of many times the magnitude of the loop currents. Loop current detectors in such an environment must therefore provide effective isolation from the loop conductors to avoid increasing the longitudinal currents and at the same time be able to detect small loop currents in the presence of large longitudinal currents.

In U.S. Pat. No. 3,671,676, which issued to J. L. Henry et al., June 20, 1972, there is described as part of a loop range extender for subscriber loops of more than 1,300 ohms resistance, a sensitive loop current detector. The described detector uses a low resistance serially connected in each conductor for sensing loop currents; longitudinal currents are cancelled in a balanced bridge of high resistance precision resistors criss-cross connected between opposite ends of the series resistors. To isolate the detecting circuitry from the conductors, an additional arrangement is used that includes a 20 kHz oscillator. Two diodes are connected in parallel in opposite polarity across the bridge output. One side of the oscillator is grounded; the other is connected through a blocking capacitor to one bridge output terminal. An output resistor is connected from ground to the other bridge output terminal through a second blocking capacitor. The diodes are therefore connected in series with the resistor across the oscillator for alternating currents. The loop current detector output voltage taken across the output resistor is thus a 20 kHz signal, the magnitude of which is roughly proportional to the conductivity of the diodes and hence to the output of the bridge which biases them.

While the Henry et al. loop current detector operates effectively for its intended purpose, it is not in all ways a perfect solution. The 20 kHz oscillator costs money and takes up space. In addition, since it is ac coupled to the loop, its signal magnitude must be kept low to avoid coupling an appreciable amount of 20 kHz noise to the loop. The low signal amplitude and critical biasing of the diodes can give rise to temperature stability problems. Finally, while it detects loop currents of either polarity, it does not detect the polarity itself.

An object of this invention is to detect loop currents with both ac and dc isolation from the loop conductors.

Another object is to detect loop currents without the disadvantages of a detecting oscillator.

A third object is to detect both the magnitude and polarity of loop currents in the presence of large longitudinal currents.

SUMMARY OF THE INVENTION

The loop current detector of my invention includes four light-emitting means and a bridge. An individual light-emitting means is responsive to unidirectional current of each direction in each loop conductor. Two light-emitting means therefore respond to loop currents of one sense, the other two light-emitting means to loop currents of the opposite sense. The bridge includes two photoresponsive arms optically coupled to the light-emitting means and two resistive arms, each photoresponsive arm being coupled to two light-emitting means that respond to loop currents of the same sense. Loop currents therefore cause only one photoresponsive arm to be illuminated to unbalance the bridge and provide high level output. Longitudinal currents, on the other hand, cause both photoresponsive arms to be illuminated to provide no ouptut.

BRIEF DESCRIPTION OF THE DRAWING

The drawing is a schematic diagram of a particularly useful embodiment of the invention.

DETAILED DESCRIPTION

In the embodiment shown in the drawing, a light-emitting diode 11 and a resistor 12 are connected in series with loop conductor 13, 13′. An oppositely poled light-emitting diode 14 is connected in parallel with light-emitting diode 11. Similarly, another parallel pair of oppositely poled light-emitting diodes 16, 17 and a resistor 18 are connected in series with loop conductor 19, 19′. A varistor 21, 22 shunts each respective resistor diode pair combination.

The output emitters of two Darlington connected *n-p-n* phototransistor pairs 23, 24 are connected to a negative voltage terminal 26. Darlington pair 24 is located so as to be fully illuminated by the light emitted from diodes 11 and 16; Darlington pair 23 is located so as to be fully illuminated by the light emitted from diodes 14 and 17. Ambient light is, of course, excluded from both Darlington phototransistor pairs, and no electrical connection is made between the light-emitting diodes and their respective phototransistor pairs.

The collector of Darlington pair 23 is connected through resistors 27 and 28 to ground; the collector of Darlington pair 24 is connected through resistors 29 and 31 to ground. A diode 32 shunts resistor 27 in a normally forward-biased polarity; similarly, diode 33 shunts resistor 29 also in a normally forward-biased polarity. Finally, a resistor 34 connects the collector of Darlington pair 23 to an output terminal 36, and a resistor 37 connects the collector of Darlington pair 24 to the other output terminal 38.

To understand the operation of the loop detector circuit of FIG. 1, consider a loop current of clockwise sense on loop conductors 13, 13' and 19, 19', that is, a current left to right on conductor 13, 13' and right to left on conductor 19, 19'. Such a clockwise loop current passes through light-emitting diode 11, illuminating Darlington pair 24, and in its return passes through light-emitting diode 16, also illuminating Darlington pair 24. The Darlington pairs and the associated resistors form a Wheatstone bridge. With no illumination falling on Darlington pair 23, there is virtually no current through resistors 27 and 28, and output terminal 36 remains approximately at ground voltage. With Darlington pair 24 illuminated by both diodes 11 and 16, appreciable current flows through resistors 31 and 29, moving the voltage of output terminal 38 towards that of negative voltage terminal 26. The greater the loop current, the higher the illumination and the greater is the negative voltage excursion of output terminal 38. The voltage between output terminals 36 and 38 therefore increases as the loop current increases. In the presence of counterclockwise sense loop current, diodes 17 and 14 illuminate Darlington pair 23, while diodes 11 and 16 are blocked and remain unexcited. Output terminal 36 therefore approaches the voltage of negative voltage terminal 26, while output terminal 38 remains at approximately ground potential. Thus the polarity of the voltage between output terminals 36 and 38 changes as the sense, or polarity, of the loop current changes from clockwise to counterclockwise, and the loop current detector thereby indicates the polarity of the loop current as well as the magnitude.

Longitudinal currents on the other hand, do not affect the detector output. Consider longitudinal currents from left to right in both conductors 13, 13' and 19, 19'. The current in conductor 13, 13' is blocked by diode 14 but passed by diode 11 to illuminate Darlington pair 24; the current in conductor 19, 19' is blocked by diode 16 but passed by diode 17 to illuminate Darlington pair 23. With a perfectly balanced bridge, equal longitudinal currents of any magnitude will provide equal voltage excursions at terminals 36 and 38, and no output voltage will exist between them. As a practical matter, with reasonably matched light-emitting diodes, phototransistor pairs and resistors, the output voltage produced by longitudinal currents can be kept low enough to easily distinguish them from bona fide loop currents.

The invention does not, of course, require Darlington phototransistor pairs for devices 23 and 24. Virtually any photoresponsive devices can be used to detect dc loop currents. The Darlington pair of phototransistors, however, provides considerable gain for a high output signal and at the same time its response is fast enough to detect dial pulses and 20 Hz ringing current.

Similarly, the invention is not restricted to the use of light-emitting diodes. Other light-emitting devices can of course be used. Since the rectifying ability of the light-emitting diodes is used in the invention as well as the light-emitting ability, however, the substitute devices must themselves rectify, or they must be connected in series with a rectifier to provide the rectifying function.

As indicated in the drawing by dashed line enclosures 39 and 40, each Darlington phototransistor pair and its two optically coupled light-emitting diodes, or other photoresponsive devices and rectifying light-emitting devices, may be packaged in one subassembly, as for instance, a plastic block. The subassemblies can further be made opaque by coating or otherwise to eliminate the possibility of optical coupling between opposite bridge arms. In one space-saving construction, the phototransistors of one Darlington pair and the two light-emitting diodes optically coupled thereto may be produced on opposite sides of a single transparent electrically insulating substrate such as glass.

Varistors 21 and 22 are included in the circuit of the drawing as a protection for the light-emitting diodes. The value of resistors 12 and 18 is chosen so that when the current through the light-emitting diode reaches the maximum allowable current, the voltage developed by the resistor will exceed the breakdown voltage of the varistor to limit further increases in voltage across or current through the light-emitting diode.

Diodes 32 and 33 have been inserted in the embodiment shown in the drawing in order to make the output of the detector a more nearly linear function of the loop current. The values for resistors 27, 28, 29, and 31 may be readily determined for optimum linearity over the range of interest by simple empirical techniques.

The light coupled loop current detector of my invention therefore produces a high level output with a very high rejection ratio for common mode longitudinal currents, both ac and dc isolation from the loop conductors and none of the disadvantages of a detector oscillator.

I claim:

1. A current detector for detecting loop currents on first and second conductors forming part of an electrical loop comprising first light-emitting means interconnected with said first conductor and responsive to current of one direction on said first conductor, second light-emitting means interconnected with said first conductor and responsive to current of the opposite direction on said first conductor, third light-emitting means interconnected with said second conductor and responsive to current of said opposite direction on said second conductor, and fourth light-emitting means interconnected with said second conductor and responsive to current of said one direction on said second conductor, said first and third light-emitting means being responsive to loop currents of one sense and said second and fourth light-emitting means being responsive to loop currents of the opposite sense, and a bridge circuit having first and second input terminals for connection to a voltage source, first and second output terminals, first and second resistive arms connected between said first and second output terminals, respectively, and said first input terminal, first photoresponsive means electrically connected between said second input terminal and said first output terminal and optically coupled to said first and third light-emitting means, and second photoresponsive means electrically connected between said second input terminal and said second output terminal and optically coupled to said second and fourth light-emitting means.

2. A current detector as in claim 1 wherein said first and second light-emitting means comprise a first pair of parallel connected oppositely poled light-emitting diodes connected in series with said first conductor and said third and fourth light-emitting means comprise a second pair of parallel connected oppositely poled light-emitting diodes connected in series with said second conductor.

3. A current detector as in claim 1 wherein said first and second photoresponsive means comprise phototransistors.

4. A current detector as in claim 3 wherein said first and second photoresponsive means comprise respective pairs of phototransistors connected in Darlington configuration.

5. A current detector as in claim 1 including a first diode connected to shunt a portion of said first resistive arm, and a second diode connected to shunt a portion of said second resistive arm whereby the voltage between said output terminals is made a more linear function of said loop currents.

6. A current detector as in claim 1 wherein said first and third light-emitting means and said first photoresponsive means are contained in a first opaque package, and said second and fourth light-emitting means and said second photoresponsive means are contained in a second opaque package.

7. A current detector as in claim 1 wherein said first and third light-emitting means and said first photoresponsive means are produced on a first substrate and said second and fourth light-emitting means and said second photoresponsive means are produced on a second substrate.

* * * * *